Patented Dec. 2, 1952

2,620,300

UNITED STATES PATENT OFFICE 2,620,300

DRILLING MUD ADDITIVE

Robert J. Given, Bartlesville, Okla., assignor to Phillips Petroleum Company, a corporation of Delaware No Drawing. Application September 2, 1949, Serial No. 113,904

15 Claims. (Cl. 252—8.5)

This invention relates to water-base drilling muds. In one aspect, it relates to a method of controlling the rheological properties of water-base drilling muds. In another aspect, it relates to a water-base drilling mud having controlled rheological properties. In another aspect, it relates to a method of preparing a rheology control agent.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations penetrated. In order to perform these important functions properly the drilling mud must have suitable viscosity-gel strengths, and other qualities at all times in spite of adverse conditions encountered in drilling the well.

One of the difficulties encountered in drilling with water-base drilling muds is the undesirable increase in viscosity and gel strengths brought about by contamination of the drilling mud with electrolytes present in the formations penetrated. In order to prevent the viscosity rise, or to reduce the viscosity of a drilling mud, the usual practice is to add quebracho and caustic soda. No satisfactory substitute for quebracho has been found prior to my discovery.

Quebracho is the extract of the wood of the quebracho tree which grows in South America. Since no satisfactory substitute for quebracho has been discovered, a shutting off of this foreign supply could injure the entire oil drilling business.

I have discovered a material which can replace quebracho in water-base drilling muds, and which is readily available in large quantities.

An object of my invention is to provide a substitute for quebracho in drilling muds.

Another object is to provide a method of controlling the rheological properties of water-base drilling muds.

Another object is to provide a method of obtaining a quebracho substitute from a domestic source.

Other objects and advantages of my invention will be apparent to those skilled in the art upon reading the following detailed description and claims.

The necessity for having a domestic source of quebracho or a quebracho substitute is, of course, obvious to those familiar with the art of well-drilling. I have discovered that the material obtained from the extraction of oil shale with aqueous caustic solution is an excellent substitute for quebracho as a rheology control agent in drilling muds. The supply of oil shale is of tremendous proportions and it is probable that it will continue to be in existence long after all of the petroleum oil has been recovered. My rheology control agent can be obtained from oil shales by intimately contacting a finely divided oil shale with an aqueous solution of caustic alkali containing from 0.5 to 50% of alkali.

The word "rheology" pertains to the flow characteristics and includes viscosity, initial gel strength and final gel strength. The word "thixotropy" generally refers to the gel strengths.

The term "oil shale" has been applied to materials having different characters and origins, but having the common property of yielding oil by distillation. In preparing my material, I prefer to use a lignitic or coaly shale which contains inorganic matter along with the lignitic material, which is principally of a subbituminous character. The organic matter is generally referred to as kerogen and on distillation, produces oil. In many shales, the volume of kerogen far exceeds that of the inorganic matter. While any of these shales may be used in preparing my product, the yield is higher and is more easily obtained from those shales having a high kerogen content.

In carrying out my invention, I prefer to pulverize the shale sufficiently to allow intimate contact with the caustic solution, but not small enough to cause serious difficulty in separating the liquid from the pulverized material. I have found a 10–30 mesh size to be quite satisfactory.

For reasons of economy and ready availability, I prefer to use caustic soda as the extractant. However, any of the alkali hydroxides may be used. In carrying out the extraction, the temperature is not critical except that with strong caustic solutions, care must be taken that the organic matter is not charred. By maintaining contact between the caustic solution and the ground shale for a sufficiently long time, the extraction can be carried out at atmospheric temperatures.

After the ground shale has remained in contact with the caustic solution for the required time, the mixture may be filtered and the residue discarded. The filtrate contains the extracted material and the excess caustic. This filtrate may be evaporated to dryness and used as the rheology control agent for drilling muds. If desired, the solution may be added directly to the drilling mud without drying, but for ease of shipment, it is preferable to remove the water. In drying, care should be taken to prevent charring of the organic matter.

The extracted organic matter may be obtained by neutralizing the caustic solution with an acid. This precipitates the organic material, which may be removed as a residue by filtration. Drying the original filtrate has the advantage that the excess caustic present is recovered. Caustic is ordinarily added to drilling muds along with rheology control agents. However, the cost of drying the solution may be greater than the cost of the caustic so recovered. The preferred method is to extract the organic matter with a weak caustic solution, 0.5 to 10% caustic, and precipitate the material from this solution by neutralization.

My shale extract is effective for reducing the viscosity and gel strengths of aqueous drilling muds and may be used in concentrations of 0.05 to 4 pounds of extract per barrel of drilling mud. Higher dosages may be used without substantially impairing the other properties of the drilling mud. However, larger amounts are ordinarily not necessary and are expensive.

suspension of bentonite in water. The additives tested were ground Utah shale, caustic extract of Utah shale, and quebracho. The desired amount of additive for each test was added to a 6% bentonite suspension. The sample was then diluted to 5.8% bentonite content by adding water in which had been dissolved the amount of sodium hydroxide desired for that particular test. Each sample was then stirred for 30 minutes on a high speed mixer and the rheological properties were determined according to the procedure outlined in API code 29. The results of these tests are shown in the following table:

| Additive | Lbs. Additive per barrel | Viscosity | | | | Initial gel strength | | | | 10 min. gel strength | | | |
|---|---|---|---|---|---|---|---|---|---|---|---|---|---|
| Pounds NaOH per bbl | | 0 | 0.25 | 0.5 | 1.0 | 0 | 0.25 | 0.5 | 1.0 | 0 | 0.25 | 0.5 | 1.0 |
| Ground shale | 0 | 33 | 100 | 100 | 100 | 3 | 50 | 300 | 300 | 50 | 150 | 300 | 300 |
| | 0.25 | 33 | 41 | 100 | 100 | 1 | 7 | 300 | ----- | 55 | 50 | 300 | ----- |
| | 0.5 | 33 | 42 | 100 | 100 | 2 | 8 | 300 | ----- | 50 | 50 | 300 | ----- |
| | 1.0 | 33 | 34 | 70 | 100 | 2 | 2 | 70 | 300 | 50 | 60 | 80 | 300 |
| | 2.0 | 33 | 34.5 | 31 | 53.5 | 2 | 3 | 3 | 25 | 50 | 55 | 75 | 70 |
| Shale extract | 0 | 33 | 100 | 100 | 100 | 3 | 50 | 300 | 300 | 50 | 150 | 300 | 300 |
| | 0.25 | 31 | 31 | 100 | 100 | 0 | 2 | 300 | 300 | 50 | 40 | 300 | 300 |
| | 0.5 | 31.5 | 25 | 45 | 100 | 2 | 0 | 17 | 300 | 50 | 30 | 80 | 300 |
| | 1.0 | 29.5 | 25 | 24 | 70.5 | 0 | 0 | 0 | 25 | 50 | 35 | 55 | 50 |
| | 2.0 | 29.5 | 21.5 | 22 | 23 | 1 | 0 | 0 | 0 | 50 | 30 | 20 | 45 |
| Quebracho | 0 | 33 | 100 | 100 | 100 | 3 | 50 | 300 | 300 | 50 | 150 | 300 | 300 |
| | 0.25 | 27 | 22 | 25 | 86 | 0 | 0 | 0 | 75 | 40 | 2 | 50 | 80 |
| | 0.5 | 28 | 19 | 18.5 | 55 | 0 | 0 | 0 | 7 | 35 | 2 | 5 | 20 |
| | 1.0 | 26.5 | 20.5 | 16.5 | 33 | 0 | 0 | 0 | 0 | 30 | 20 | 0 | 0 |
| | 2.0 | 27 | 26 | 17.5 | 17 | 0 | 0 | 0 | 0 | 30 | 35 | 2 | 0 |

My rheology control agent is compatible with other materials ordinarily used in drilling muds. Its function is not impaired by the use of a water-loss reducer in the drilling muds, nor is the function of the latter impaired by the shale extract. These water-loss reducers are ordinarily water-soluble cellulose or starch derivatives containing an acidic substituent. The presence of weighting agents such as barium sulfate or contaminants such as calcium sulfate does not impair the effectiveness of my agent.

For the purpose of running tests, a sample of shale extract was prepared by agitating a portion of finely-ground shale (20 mesh) with a 1% solution of sodium hydroxide for 4 hours. The mixture was allowed to stand for 16 hours and was filtered. The filtrate was then neutralized with hydrochloric acid, which precipitated a dark brown material. The precipitate was filtered, washed with water, and dried at 105° C. This residue was again washed with water and re-dried before testing.

In tests using a 5.8% bentonite suspension in water, my extract in amount equivalent to ½ pound per barrel reduced the viscosity by 24%; in an amount equivalent to 1 pound of additive per barrel of fluid, the reduction was 27%; and, at 2 pounds per barrel, the reduction was 35%. Ground shale alone in an amount equivalent to 2 pounds per barrel decreased the viscosity of the fluid by 6%.

My invention will be more clearly illustrated by the following examples in which are described the tests in which my shale extract is used as a rheology control agent.

*Example I*

Tests were run to compare the effect of 3 additives on the rheological properties of a 5.8%

As a general rule, it would seldom be desirable to use less than 0.25 pound of shale extract per barrel of drilling fluid because the effect would be too small. Above about 6 pounds per barrel, the small increase in effect would not warrant the additional cost of material. The use of larger amounts of the extract would not, however, ruin the drilling mud. The exact amount to be added depends on the particular mud and on the properties desired. This can be determined by very simple tests at the time the addition is to be made. This is the procedure that is followed in using any additive in drilling muds.

While the tests shown herein were carried out with the extract of a Utah oil shale, any of the materials which are characterized as oil shale will yield a satisfactory extract. In preparing this extract, it is obvious that shales having high contents of kerogen or organic matter are preferred because they produce higher yields. My invention is not limited to any particular mud system, but is effective in any water-base drilling mud in which it is desired to use a rheology control agent. Variations in the composition of the drilling mud and in the method of obtaining the shale extract are entirely within the scope of my invention, which is limited only by the following claims.

Having described my invention, I claim:

1. A water-base drilling mud comprising, in combination, sufficient water to maintain the mixture fluid, sufficient clayey material to form a filter cake on the wall of the well, a sufficient amount of caustic alkali to maintain the mud alkaline, and a sufficient amount of a caustic extract of oil shale to maintain the viscosity of the mud low enough that the mud can be circulated.

2. A water-base drilling mud comprising, in combination, sufficient water to maintain the mixture fluid, sufficient suspended solids to form a filter cake on the wall of the well, a sufficient amount of caustic alkali to maintain the mud alkaline, and a sufficient amount of a caustic extract of oil shale to maintain the viscosity of the mud low enough that the mud can be circulated.

3. A water-base drilling mud comprising, in combination, sufficient water to maintain the mixture fluid, sufficient clayey material to form a filter cake on the walls of the well, a sufficient amount of caustic alkali to maintain the mud alkaline, a sufficient amount of a dispersing and water-loss reducing agent to maintain a satisfactory water-loss, and a sufficient amount of a caustic extract of oil shale to maintain the viscosity of the mud low enough that the mud can be circulated.

4. A water-base drilling mud comprising, in combination, sufficient water to maintain the mixture fluid, sufficient caustic alkali to give an alkaline fluid, sufficient suspended solids to form a filter cake on the walls of the well, a sufficient amount of a dispersing and water-loss reducing agent to maintain a satisfactory water-loss, and a sufficient amount of a caustic extract of oil shale to maintain the viscosity of the mud low enough that the mud can be circulated.

5. A rheology control agent which has been prepared by intimately contacting a finely-divided oil shale with an aqueous solution of caustic alkali containing from 0.5 to 50% of caustic, filtering the mixture, neutralizing the filtrate with an acid to precipitate the extracted material, and removing the precipitated residue.

6. A rheology control agent which has been prepared by contacting a portion of finely-divided oil shale with a 1% aqueous solution of sodium hydroxide, filtering the mass to remove the solid material, neutralizing the filtrate with hydrochloric acid to precipitate the residue extracted, and separating said precipitated residue from the liquid.

7. A method of preparing a rheology control agent for aqueous drilling muds which comprises extracting a finely-ground oil shale with an aqueous caustic solution, filtering the extract, and drying the filtrate to yield said control agent.

8. A method of preparing a rheology control agent for aqueous drilling muds which comprises extracting a finely-ground oil shale with an aqueous caustic solution containing from 0.5 to 50% of caustic alkali, filtering the extract, and drying the filtrate to yield said control agent.

9. The method of claim 8 wherein the caustic alkali is sodium hydroxide.

10. A method of preparing a rheology control agent for aqueous drilling muds which comprises extracting a finely-ground oil shale with an aqueous caustic solution containing from 0.5 to 50% of caustic alkali, filtering the extract, neutralizing the filtrate with acid to precipitate the extracted material, filtering the solution to recover the precipitated residue, and drying said residue.

11. The method of claim 10 wherein the acid used is an inorganic acid.

12. A method of preparing a rheology control agent for aqueous drilling muds which comprises extracting a finely-ground oil shale with an aqueous caustic solution, filtering the extract, neutralizing the filtrate with acid to precipitate the extracted material, filtering the solution to recover the precipitated residue, and drying said residue.

13. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations while maintaining the viscosity of said mud within a range wherein said mud is circulatable in said well which comprises admixing with said drilling mud and interacting therewith a sufficient amount of a caustic extract of oil shale to maintain the viscosity of said mud low enough that the mud can be circulated, and contacting said wall of said well with the resulting drilling mud to form said filter cake thereon.

14. In a process for drilling a well with well drilling tools wherein there is circulated in the well a water base drilling mud containing sufficient suspended solids to form a filter cake on the wall of the well suspended in sufficient water to render the same circulatable, the method of forming a filter cake on the wall of said well to decrease the loss of fluid from said drilling mud contained therein into surrounding earthen formations while maintaining the viscosity of said mud within a range wherein said mud is circulatable in said well which comprises admixing with said drilling mud and interacting therewith a sufficient amount of a caustic extract of oil shale to maintain the viscosity of said mud low enough that the mud can be circulated, and contacting said wall of said well with the resulting drilling mud to form said filter cake thereon.

15. In a process for drilling a well with well drilling tools wherein there is circulated in the well a water base drilling mud containing sufficient suspended solids to form a filter cake on the wall of the well suspended in sufficient water to render the same circulatable, the method of forming a filter cake on the wall of said well to decrease the loss of fluid from said drilling mud contained therein into surrounding earthen formations while maintaining the viscosity of said mud within a range wherein said mud is circulatable in said well which comprises admixing with said drilling mud and interacting therewith sufficient to maintain the viscosity of the mud low enough so that the mud can be circulated of a caustic extract of oil shale obtained by extracting an oil shale with an aqueous caustic solution, neutralizing a resulting solids-free extract with an acid to precipitate the extracted material, and recovering the precipitated residue, and contacting said wall of said well with the resulting drilling mud to form said filter cake thereon.

ROBERT J. GIVEN.

REFERENCES CITED

The following references are of record in the file of this patent:

UNITED STATES PATENTS

| Number | Name | Date |
| --- | --- | --- |
| 1,820,917 | Langford et al. | Sept. 1, 1931 |
| 2,208,172 | Urbain | July 16, 1940 |
| 2,309,366 | Urbain | Jan. 26, 1943 |

OTHER REFERENCES

Article in "Petroleum," German periodical, vol. 28, No. 44, pgs. 7 and 8, Nov. 2, 1932.